US005611073A

United States Patent [19]
Malpure et al.

[11] Patent Number: 5,611,073
[45] Date of Patent: Mar. 11, 1997

[54] METHOD OF ENSURING PARAMETER COHERENCY IN A MULTI-PROCESSOR SYSTEM

[75] Inventors: Sandesh Malpure, Novi, Mich.; Raymond B. Reed, Noblesville, Ind.

[73] Assignee: Delco Electronics Corp., Kokomo, Ind.

[21] Appl. No.: 386,041

[22] Filed: Feb. 9, 1995

[51] Int. Cl.⁶ ................................................. G06F 11/30
[52] U.S. Cl. .................... 395/468; 395/472; 395/475; 395/495; 395/183.13
[58] Field of Search .............................. 395/468, 472, 395/495, 550, 183.15; 371/57.1, 61, 62

[56] References Cited

U.S. PATENT DOCUMENTS

| 4,942,521 | 7/1990 | Hanawa et al. | 395/455 |
| 5,193,167 | 3/1993 | Sites et al. | 395/490 |
| 5,384,713 | 1/1995 | Kleinfelder | 364/550 |
| 5,438,575 | 8/1995 | Bertrand | 371/48 |

*Primary Examiner*—Kenneth S. Kim
*Attorney, Agent, or Firm*—Mark A. Navarre

[57] ABSTRACT

In a multiprocessing machine having several processors which take turns in executing an instruction, processing of two related parameters in one processor takes place at different times so that the parameters are non-coherent for a short time. Program counter addresses have a bit reserved as a flag which is set during non-coherence. When a CPU requests parameter values from the machine, coherency of the parameters is guaranteed by reading the flag as well as the parameters and a CPU software routine determines the coherent values.

13 Claims, 3 Drawing Sheets

METHOD OF ENSURING PARAMETER COHERENCY IN A MULTI-PROCESSOR SYSTEM

FIELD OF THE INVENTION

This invention relates to a multi-processor or multi-tasking microprocessor system and particularly to a method for efficiently assuring coherent readings of related parameters which are processed at different times.

BACKGROUND OF THE INVENTION

It is already known in automotive engine control systems as well as in other microcontroller systems to employ computer arrangements which have a central processor unit (CPU) to execute a control program and to have certain functions processed by a specialized adjunct unit which very efficiently operates on certain data by parallel processing. That is, several processors such as single instruction machines (SIMs) each having a list of instructions which are executed one at a time. A system timer triggers each processor in turn to execute one instruction during a single machine loop; the loop is repeated to enable each processor to continue through its agenda of instructions.

One example of such an adjunct system is a timer input/output (TIO) unit used with an engine control and is capable of monitoring several input signals to capture the time of a pulse edge and to accumulate the number of such edges, as well as to issue output pulses precisely at computed times. The input signals may, for example, represent engine speed and engine induction mass air flow, and the output pulses may be fuel injection or spark timing commands. The CPU interacts with the TIO to read or write information in a TIO RAM area.

In a multiprocessing or multi-tasking environment, variables related to one task are updated and referenced by the different processors and processes at different times. To guarantee the coherency and validity of the data, complex software algorithms are normally needed.

For example, an input capture algorithm captures the timer value upon the occurrence of a rising or a falling edge of a pulse and increments the corresponding edge counter. The tasks of incrementing the counter and capturing the time are carried out at different times by one of the instruction machines of the TIO. The CPU can read these values at a random time and has to make sure that it has read coherent values. If the CPU reads these values in between the updates of the time and the counter, non-coherent readings will be obtained. A processor can perform a complex and time consuming algorithm which again reads the values after a specific time and, if they have not changed, then declare them as coherent values.

SUMMARY OF THE INVENTION

It is therefore an object of the invention to obtain coherent values from a multiprocessing or multi-tasking environment simply and with minimal time expense. Another object is to easily determine whether values from such an environment are coherent, and if not, to quickly read values which are coherent. Still another object is, if non-coherence is detected, to update one value to effect coherence.

A microprocessor has a CPU and a specialized multiprocessor for performing specific tasks. Data manipulated by the multiprocessor is stored in a RAM at addresses which are accessible by the CPU. Thus if a certain time of a pulse edge is captured and stored at an address the CPU can read that parameter at any time. Also, if a counter is incremented after the time capture is processed its updated value will be stored at another address which can be read by the CPU. The two parameters will always be coherent except in the short time interval after the time value is updated and before the count value is updated.

The multiprocessor has a number of processors or machines each of which has instructions stored at specific addresses for performing a given function, and a program counter or pointer under control of an algorithm for each processor which indicates the address of the instruction to be executed next. When an instruction is executed, the program counter then indicates another address (or repeats the same address) for execution in the next machine loop. In the meantime all the other processors, in turn, are serviced so that most of the next loop time is spent waiting for activation. Thus the timing of each instruction execution can be viewed as occurring just at the end of a machine loop time.

Each program counter has typically 8 bit words which correspond to unique addresses. According to this invention, one of the bit positions is reserved for use as a flag which is set to a given state (preferably 1) only when the parameters are incoherent, that is, when the program counter addresses the instruction for updating the second parameter (e.g. incrementing the pulse counter).

The CPU may read the parameters at any time and reads the flag as well. Based on the state of the flag it can be determined whether there is any question of non-coherency and if so, what corrective action may be taken. In one method, the first parameter (capture timer) is read, the flag is read, if the flag does not indicate a non-coherent state, the second parameter is read and accepted as coherent with the first parameter. Where the flag does indicate a non-coherent state, the CPU waits for sufficient time for the flag to clear (one loop time) and reads both parameters and accepts them as coherent. This method takes very little CPU code and removes the traditional requirement that the CPU always wait for at least one machine loop. The probability that a non-coherent state is encountered is very low and thus it is seldom required to wait for a machine loop before completing a successful reading.

A second method requires a little more CPU code but eliminates the wait for a machine loop. The CPU first reads the flag, then reads the first and second parameters, then again reads the flag. The time between the flag readings must not exceed a machine loop time. Then certain conclusions about coherency can be reached based on the flag readings. If both flag readings indicate coherence, the parameters are accepted as coherent. If both flag readings indicate a non-coherent state, the second parameter is updated (incremented in the case of a counter) by the CPU and the count is accepted as coherent. If only the first flag reading indicated non-coherence, the parameters are read again and accepted as coherent. If only the second flag reading indicated non-coherence, the method is repeated from the beginning.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
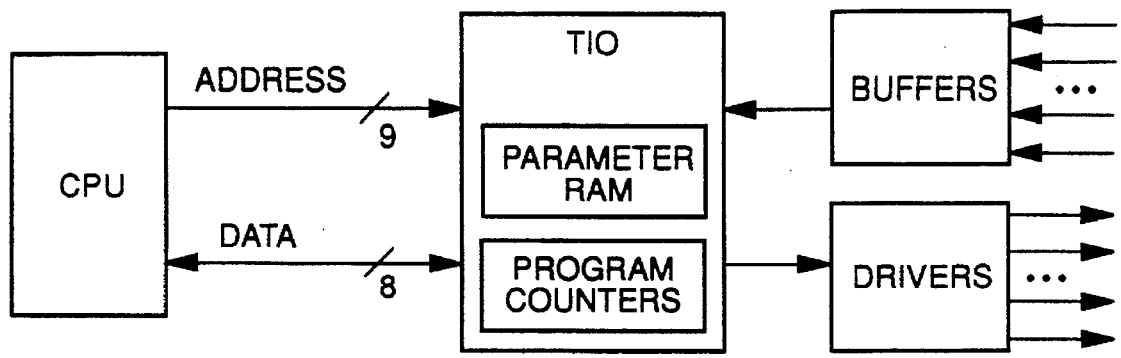
FIG. 1 is a diagram of a prior art microprocessor arrangement which may employ the invention.

Referring to FIG. 1, a CPU is coupled by an address bus and a data bus to a TIO or timer input/output unit. A parameter RAM in the TIO contains memory locations at addresses which may be accessed at any time by the CPU to read values from the RAM or write values to the RAM. Program counters in the TIO also address memory locations to manipulate data according to programmed functions. Buffers receive input signals in the form of pulses and apply them to the TIO for use by the programmed functions, and output signals developed by the TIO are coupled through drivers to control lines. The input signals contain information in the form of pulse width or pulse frequency relating to engine or vehicle parameters such as speed and the rate of mass air intake. The output signals are also pulses for commanding fuel injection or spark timing, for example.

Figure 2:
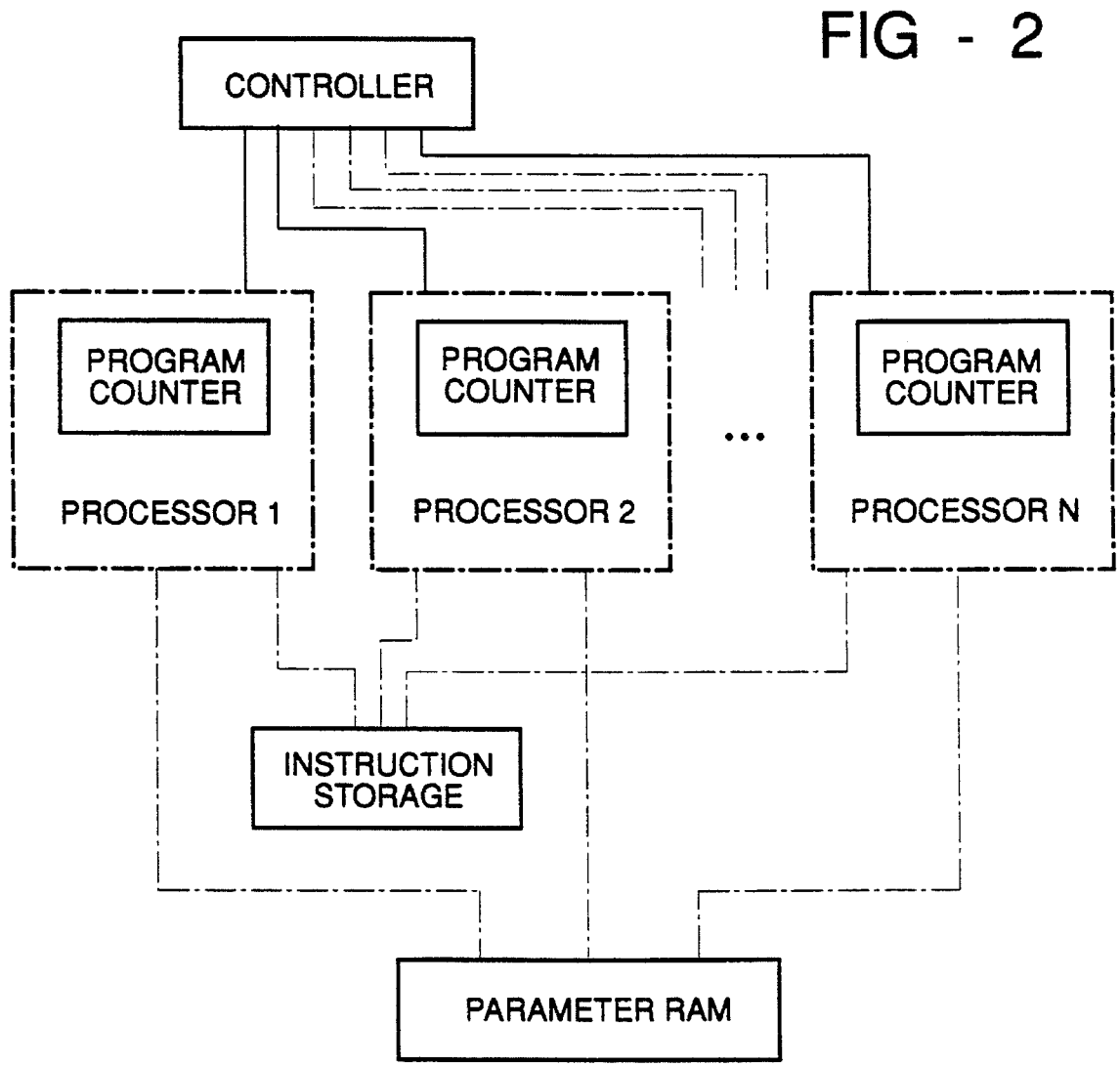
FIG. 2 is a diagram of a timer input/output unit of the system of FIG. 1.

The TIO is further illustrated in FIG. 2. It is functionally divided into a number of processors or single instruction machines which are sequentially activated by a controller for performing a single instruction upon each activation. Each sequence of activation is termed a machine loop which occurs periodically and requires a single machine loop time. That machine loop time depends upon the design and operation of the TIO and is, for example, on the order of 7 to 15 microseconds. A program counter for each processor contains the address of the next instruction to be executed. The addresses typically are 8 bit words and are selected by an algorithm to perform the desired function. When an instruction is executed the next address is immediately posted in the program counter but the next addressed instruction will not be executed until the end of the next machine loop time.

Figure 3:
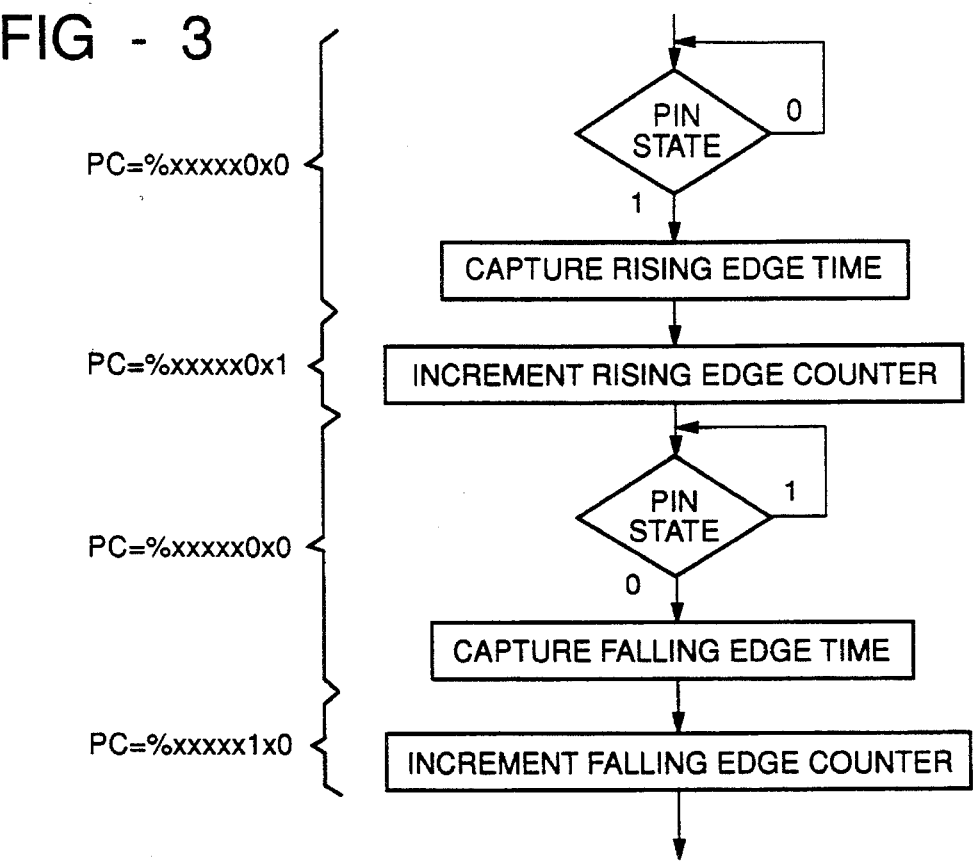
FIG. 3 is a flow chart representing a TIO microcode program and instruction addresses according to the invention.

FIG. 3 is a flow chart which illustrates the algorithm for input capture and pulse accumulator functions. The program counter address for each instruction has the form of %xxxxx0x0 where the x bits may be either 1s or 0s but the bit0 and bit2 positions of the address word are reserved for flags. For the first instruction both flags are 0. The first instruction is to monitor the voltage on an input pin for a rising edge pulse; if a rising pulse edge does not occur the program counter again asserts the first instruction for execution at the end of the following machine loop. When a rising edge of a pulse occurs the pin state changes from 0 to 1, and then the rising edge time is captured and the next program counter address is asserted to instruct the rising edge counter to increment. The address for that instruction has the bit0 flag set to 1 which indicates that the rising edge time and the rising edge counter are not coherent since the counter increment does not take place until the end of the next machine loop time. When the increment does occur the parameters will be coherent and the new program counter address will have the bit0 flag changed back to 0. Thus that flag is always zero except when the rising edge increment is pending. The falling edge time capture and counter increment operate in exactly the same way as the rising edge functions. In this case, the bit2 flag is used to indicate non-coherency while the falling edge counter increment is pending. It should be noted that many machine loops can be spent waiting for an edge to occur so that parameters are usually coherent, and non-coherence occurs only for the short loop time following each edge capture.

Figure 4:
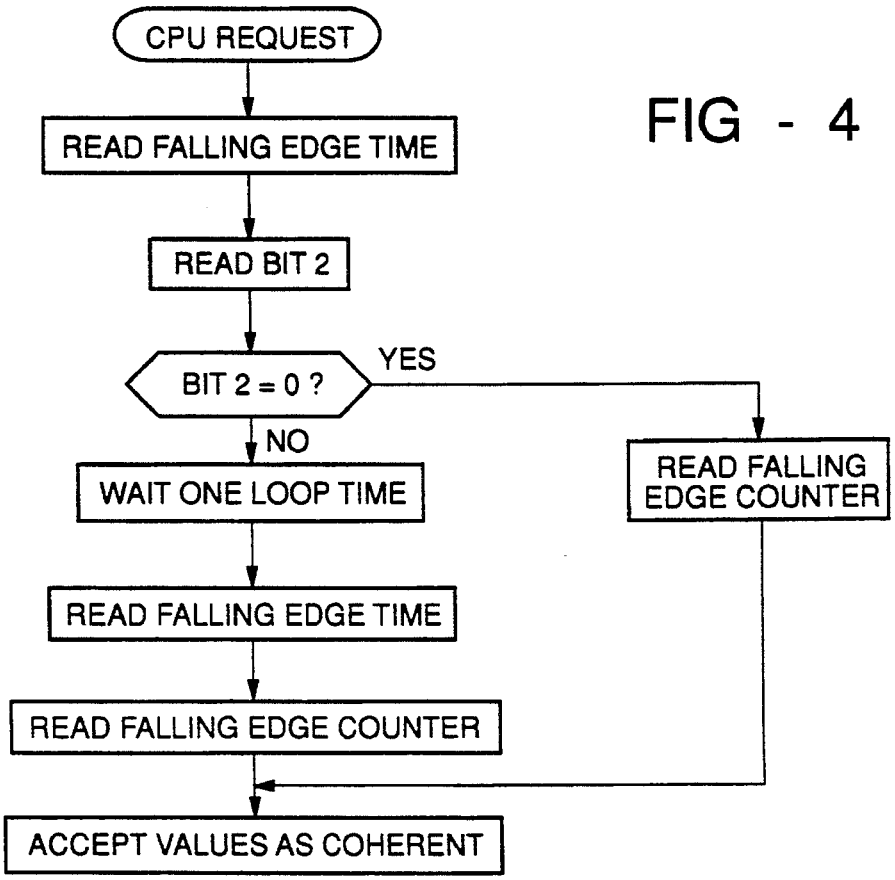
FIGS. 4 and 5 are flow charts of two embodiments of CPU software methods according to the invention.

Using the flags, the CPU can read the edge capture times and the pulse counts and be certain of getting coherent sets of values by either of two simple methods which are carried out by CPU software. These are illustrated here in FIGS. 4 and 5 for the case of reading falling edge time and counter; the same procedure applies to the rising edge case. The first method is shown in FIG. 4. The first parameter (falling edge time) is read and the bit2 flag is then read. If the flag is 0, the second parameter (falling edge counter) is read and the parameter values are accepted as coherent. However, if the flag is 1, the parameters are non-coherent at that time and the CPU waits for one machine loop time and then reads both parameters which are accepted as coherent. This method employs a minimum of software and the need to wait for a machine loop time seldom arises.

Figure 5:
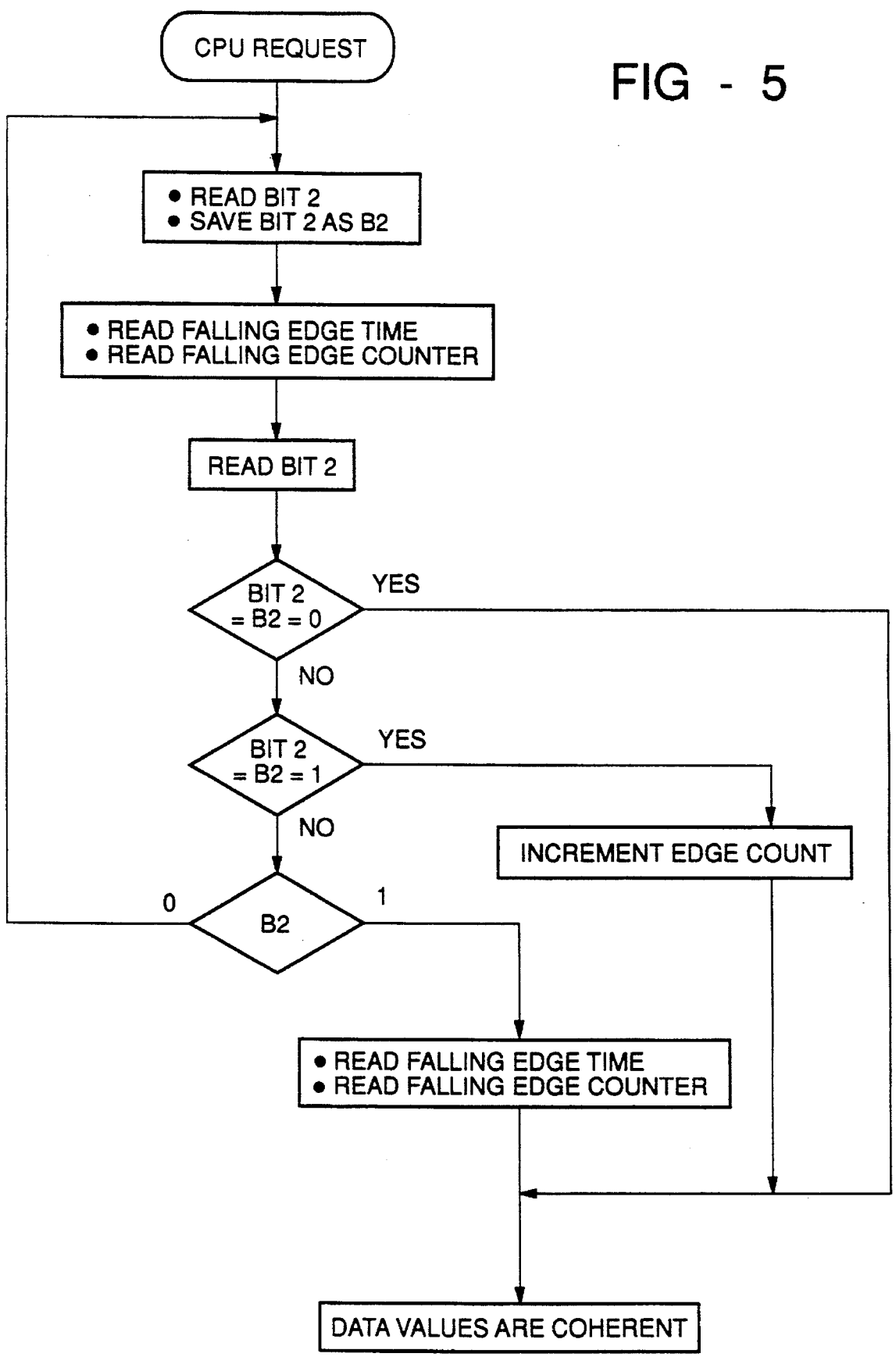

The second method is shown in FIG. 5. The BIT2 flag is read a first time and saved as B2. Then the falling edge time and the falling edge counter are read, and the BIT2 is read a second time. The two readings of BIT2 must occur in the span of less than one machine loop time in order for the following conclusions to be valid. If both BIT2 and B2 equal 0 the parameters are coherent. If both BIT2 and B2 equal 1, the timer has been processed but not the counter. The CPU increments the edge count value and that is coherent with the time value. If BIT2 and B2 are different but b2 is 1, this indicates that BIT2 is 0 and a coherent phase of the process has just been entered; then both the falling edge time and the edge counter are again read and accepted as coherent. When, however, B2 is 0 and BIT2 is one the exact status of the time when read cannot be determined, so the algorithm is repeated. This method is quickly executed by the CPU and even if the algorithm is repeated there is no need to wait for a machine loop time.

Thus it is seen that the stratagem of using bit positions in an instruction address as flags to indicate non-coherency of data being read allows the CPU to quickly determine guaranteed coherent values. The illustration of input capture and pulse accumulator functions is but one example of a suitable application. There are other similar applications which use an incrementing step as the second of a pair of related instructions, such as a two word counter wherein when the first word of a count value in a register rolls over to a clear state the second word is incremented. While the second method of assuring coherency is easily implemented when the second instruction is an increment function, it is also practical to employ it for other functions.

The embodiments of the invention in which an exclusive property or privilege is claimed are defined as follows:

1. A method of ensuring parameter coherency in a multi-processor system in which given processor includes a program counter storing an address of an instruction to be executed, and first and second instructions which are consecutively executed to respectively update first and second parameters, the first and second parameters being non-coherent for a period between the execution of the first and second instructions, the method comprising the steps of:

setting a flag bit to indicate when an address corresponding to the second instruction is stored in the program counter;

reading the first parameter;

reading the flag bit;

if the flag bit indicates the address corresponding to the second instruction is not stored in the program counter, reading the second parameter; and accepting the first and second parameters as coherent.

2. The method as defined in claim 1 wherein:
if the flag bit indicates the address corresponding to the second instruction is stored in the program counter, waiting until the second instruction has been executed;
then reading the first and second parameters; and
accepting the first and second parameters as coherent.

3. The method as defined in claim 2 wherein the multi-processor system has a machine cycle, and an instruction addressed by the program counter is executed once per machine cycle, and wherein:
the step of waiting until the second instruction has been executed comprises waiting one machine cycle.

4. The method as defined in claim 1, wherein the flag bit is a part of the address of the second instruction.

5. A method of ensuring parameter coherency in a multi-processor system in which a given processor includes a program counter storing an address of an instruction to be executed, and first and second instructions which are consecutively executed to respectively update first and second parameters, such that the first and second parameters are non-coherent for a period between the execution of the first and second instructions, wherein the second instruction serves to increment the second parameter, and wherein a bit of each address serves as a flag indicating which of the first and second instructions is to be executed, the method comprising the steps of:
reading the flag bit a first time;
reading the first and second parameters;
reading the flag bit a second time;
if both flag bit readings indicate that the first instruction is to be executed, accepting the parameters as coherent; and
if both flag bit readings indicate that the second instruction is to be executed, incrementing the second parameter and then accepting the first and second parameters as coherent.

6. The method as defined in claim 5 wherein:
if only the first flag bit reading indicates that the second instruction is to be executed, again reading the first and second parameters and accepting the first and second parameters as coherent.

7. The method as defined in claim 5 wherein:
if only the second flag bit reading indicates that the second instruction is to be executed, repeating the steps of claim 5.

8. A method of ensuring parameter coherency in a multi-processor system having a central processor unit (CPU) and a timer unit having a program counter storing an address of an instruction which is scheduled to be executed, and first and second instructions which are consecutively executed to respectively update first and second parameters, the method comprising the steps of:
in the timer unit,
assigning an instruction address bit as a flag indicating whether the second instruction is scheduled to be executed,
storing the first instruction in the program counter,
executing the first instruction to update the first parameter;
storing the second instruction in the program counter; and
executing the second instruction to update the second parameter, wherein the parameters are non-coherent when the address of the second instruction is stored in the program counter;
in the CPU,
reading the first parameter,
reading the flag
reading the second parameter,
accepting the first and second parameters as coherent if the read flag does not indicate that the second instruction is scheduled to be executed.

9. The method as defined in claim 8 wherein:
if the read flag indicates the second instruction is scheduled to be executed,
waiting sufficient time for the second instruction to be executed, then
reading the first and second parameters a second time, and
accepting the second reading of the first and second parameters as coherent.

10. A method of ensuring parameter coherency in a multi-processor system having a central processor unit (CPU) and a timer unit having a program counter storing an address of an instruction which is scheduled to be executed, and first and second instructions which are consecutively executed to respectively update first and second parameters, the method comprising the steps of:
in the timer unit,
assigning an instruction address as a flag indicating whether the second instruction is scheduled to be executed,
storing the first instruction in the program counter,
executing the first instruction to update the first parameter;
storing the second instruction in the program counter; and
executing the second instruction to update the second parameter, wherein the parameters are non-coherent when the address of the second instruction is stored in the program counter;
in the CPU,
reading the flag a first time,
reading the first and second parameters,
reading the flag a second time; and
if both first and second readings of the flag indicate that the second instruction is not scheduled to be executed, accepting the first and second parameters as coherent.

11. The method as defined in claim 10 wherein the second instruction serves to increment the second parameter, and wherein:
if both readings of the flag indicate that the second instruction is scheduled to be executed, incrementing the second parameter, and then accepting the first and second parameters as coherent.

12. The method as defined in claim 10 wherein:
if only the second reading of the flag indicates that the second instruction is scheduled to be executed, again reading the flag and the first and second parameters and then repeating the steps of claim 10.

13. The method as defined in claim 10 wherein:
if only the first reading of the flag indicates that the second instruction is scheduled to be executed, again reading the first and second parameters and accepting them as coherent.

* * * * *